April 4, 1944.  R. G. DEAN  2,345,555
COMPRESSOR FOR PISTON RINGS AND THE LIKE
Filed July 13, 1943
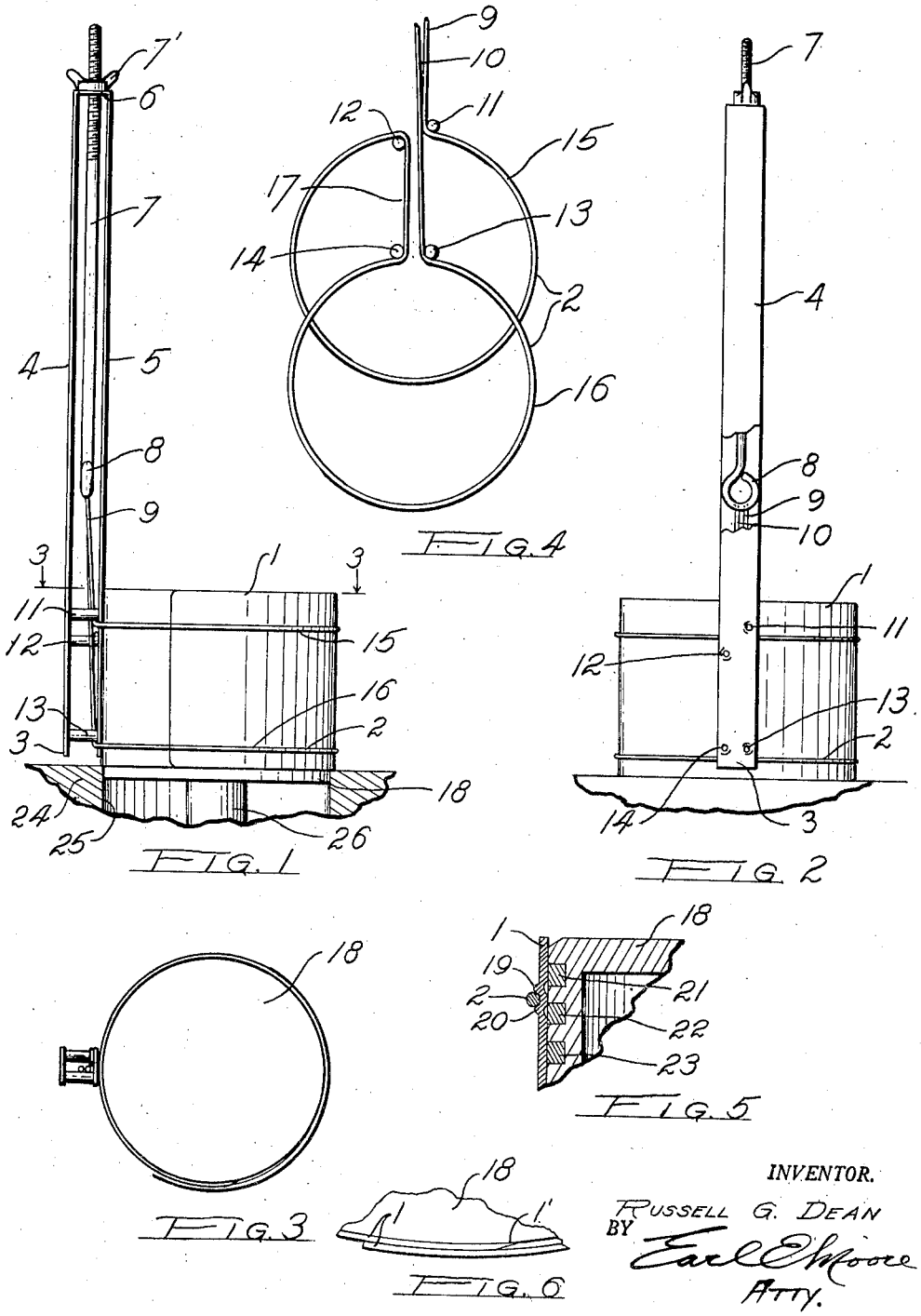
INVENTOR.
RUSSELL G. DEAN
BY Earl E. Moore
Atty.

Patented Apr. 4, 1944

2,345,555

UNITED STATES PATENT OFFICE 2,345,555

COMPRESSOR FOR PISTON RINGS AND THE LIKE

Russell G. Dean, Los Angeles, Calif.

Application July 13, 1943, Serial No. 494,464

4 Claims. (Cl. 29—86.4)

This invention is for a means and method of compressing piston rings and the like into their respective annular grooves about the outer surface of piston heads, etc. Bothersome ratchets and friction devices are not employed in this invention for forcing the rings into place in their grooves, which must be done before the piston head is slipped into the bore of the engine, pump, etc. The means which hold the rings in the grooves consists of a sheet of spring steel or some other suitable material which is wrapped around the piston head over the rings, and which overlaps on itself. A cable passes around the sheet, band, or wrapper and connects with a cable tightening means, the band is then squeezed against the piston head, a portion of the outer overlapping portion of the band slipping over the inner underlapped portion until the band is tight enough on the piston head to force all the rings into their respective grooves. By this means and method, the rings are not shifted in their grooves during the tightening of the band, this band slipping action eliminating breakage of the rings due to slipping, and an important feature is that the ring gaps will remain where they are placed by the operator.

The band employed in this invention is plain in that it has no bothersome projections of any kind, such as bolts, screws, levers and the like, no friction blocks, clamps, or ratchets to back up or let go, but, nevertheless, the pull is constant and smooth in that the cable envelopes the band and has only two ends to be pulled which allows it to equalize itself and give equal pressure to both top and bottom portions of the band. It works easier and smoother than the prior art devices because both ends of the band are free to move, and since most of the slipping of the band is done by that portion of the band that overlaps and which is not in contact with the piston and the rings, the rings are not disturbed in their set positions. Because of the overlapping feature of the band and the use of the powerful cable means for tightening the band, a much heavier and thicker band can be used which does not require nicks, flares or any other slight projections in order to prevent the band from following the piston when it is inserted into the cylinder bore; therefore, the thicker band avoids the wedging of the band between the piston and the cylinder wall thereof.

One of the principal objects of the invention is to present a new and novel means and method of compressing piston rings and the like on the heads of pistons so that the piston can readily and quickly be inserted into the bore of a cylinder with perfect safety and dependability.

Another object is to provide a foolproof and non-bothersome means for compressing piston rings on the heads of pistons so that the heads can readily be inserted into the bores of cylinders with the least interference, the means comprising a device that can be shipped in flat packages.

Still another object of the invention is to provide a piston ring compressor that is simple and sturdy in construction, free of projections, easy to operate, and economical to make and manufacture.

Other objects advantages and features of my invention will appear from the accompanying drawing, the subjoined detailed description, the preamble of these specifications and the appended claims.

Applicant is about to illustrate and describe one of the forms of his invention in order to teach one how to make and use the same, but it is to be understood that the drawing and description thereof are not to limit the invention in any sense whatsoever, except as limited by the appended claims.

In the drawing:

Fig. 1 shows the invention in side elevation and positioned on the top of an engine cylinder block and in registration with the bore thereof, part of the figure being shown in section, Figure 2 is a rear elevational view with a part thereof being broken away, Fig. 3 is a horizontal view of Fig. 1 taken substantially along the line 3—3 thereof, Fig. 4 is a somewhat perspective view showing the cable arrangement, Fig. 5 is a sectional view of a portion of the invention on a large scale to show a detail, and Fig. 6 is an enlarged plan view of a portion of the band employed in the invention to show a detail.

The invention comprises three major parts, the flexible band, shell or wrapper 1, cable or cord 2, and the standard or cable tightening unit 3. The band 1 is a plain sheet of spring steel of the type used in clocks, the band should have a width somewhat less than the depth of the piston upon which it is to be used, and a length sufficient to wrap entirely around the piston and overlap, before the tightening operation is begun, about an inch. The corners of the band are rounded so as not to catch in clothes etc. Although spring steel has been mentioned as the proper material for the band, it is obvious that any suitable material may be substituted for the steel, such as sheet plastics, fibre, etc.

The standard or tightening unit 3 comprises a strip of suitable metal having two long legs 4 and 5 joined by the short integral top piece 6. It is preferable to have the strip in one piece so as to reduce riveting, welding and brazing operations in its manufacture. The top piece 6 has a hole through which passes an elongated stem 7 upon which is a running thread almost from end to end thereof. The lower end of the stem is formed into an eyelet or coupling element 8, and through the bottom of which are a pair of spaced holes for reception of the cable ends 9 and 10. Any satisfactory means may be employed for securely holding the cable ends in the holes of the eyelet. The ends may be soldered, brazed, welded, or just pressure squeezed under heat while in the holes. A threaded collar or winged nut 7' is shown as screwed onto the end of the stem and the purpose of this winged nut is for tightening the cables by screwing downwardly on the stem against the top of the piece 6 so as to raise the eyelet 8. By providing a winged nut, a wrench is not likely to be used by the operator so as to cause the threads to strip. However, in order to save the threads upon the stem, the metal of the winged nut should not be as hard as the metal of the stem so that the threads in the nut will strip before the threads on the stem.

At the lower portion of the standard 3 are the bars or studs 11, 12, 13 and 14 arranged as shown. Each stud has its ends reduced in size to form rivet ends which enter small holes in the legs 4 and 5 and are hammered for a tight fit. The studs form stationary bearings for the cable, but in the event roller bearings are preferred, the studs may be substituted by roller sleeves riding upon rivet pins which are fixed into the legs 4 and 5. As clearly illustrated in the drawing, the cable has two loops, a loop 15 and a loop 16, one an upper loop and the other a lower loop, one end of each loop being joined by the vertical cable portion 17, and the other ends thereof terminating in the ends 9 and 10 which are securely fastened to the eyelet 8. From the above construction, it should now be apparent that the band 1 is forced into an ever growing smaller compass as the eyelet 8 is forced upwardly by turning the nut 7', and note, that while such action is taking place, that the top and bottom loops 15 and 16 respectively are drawn with equal force and exactly the same distance so that the band 1 is evenly tightened onto the piston head, the piston head being indicated by 18. Such a cable must be very strong and an airplane strut cable made up of 42 strands of steel wire has been found to be very satisfactory.

So that the cables will always remain in proper position upon the outer surface of the band 1, spaced apart beads 19 and 20 are pressed formed on the band at each cable position, note Fig. 5. The elements 21, 22 and 23 represent piston rings, and in this Fig. 5, they are shown fully compressed into their respective grooves by the band 1. In Fig. 1, the inventive device is shown resting on the top of an engine block 24 having the cylinder bore 25, and a piston rod 26 is shown which is pivoted to the piston head 18 in the usual manner. Note that the piston head is slightly within the bore 25 and that the band 1 has its bottom edge resting upon the top of the cylinder block 24, and that the thickness of the band is sufficient that it cannot enter the cylinder bore when the piston head 18 is forced into the bore 25. A band thickness of 0.020" has proven very satisfactory. The inner end of the band should be provided with a ground taper so as to further avoid the possibility of the band gripping the piston rings and shifting them. The ground taper is shown at 1' in Fig. 6.

The bands and cables are sized according to the diameter of pistons. For instance, one size may be sufficient to accommodate pistons ranging in diameter from 2⅞ inches to 5 inches, and another size, truck size, may accommodate pistons ranging in diameter from 4 inches to 7½ inches. Since the inventive device is designed to compress piston rings on a variety of intermediate piston sizes between the minimum and maxmium diameters of certain size groups, it dispenses with the need for storing a large number of ring compressor bands and different lengths of cables.

It is, of course, understood that various changes and modifications may be made in the details of form, style, design and construction of the whole or any part of the specifically described embodiment of this invention without departing from the spirit thereof, such changes and modifications being restricted only by the limitations clearly expressed in the following claims.

Having thus described my invention, what is claimed as new and desired to be secured by Letters Patent is:

1. A piston ring compressor unit comprising an overlapping flexible band having a cylindrical form and a standard having a cable operating end and a power working end, said cable operating end having one side thereof in abutment with a side of the band, a plurality of cable spacing means fixed to the cable operating end of the standard and cable pulling means at the power working end of the standard, cable coupling means at a lower end of the cable pulling means, a continuous cable formed into a plurality of spaced apart loops about the band, one end of each loop being closed and having bearing relation with part of the cable spacing means and the other ends of the cable having bearing relation with another part of the cable spacing means and terminated in fixed relationship with the cable coupling means, so that when the cable pulling means is operated in one direction the loops are tightened about the band for reducing the perimeter thereof, said construction being so related that the cable extends from the cable coupling means, thence around a spacing means, thence around the band to another cable spacing means, thence around said spacing means, axially of the band to another spacing means, around said spacing means, thence around the band in opposite direction from said first loop around the band, thence around a spacing means and to said cable coupling means.

2. The unit recited in claim 1 wherein the band has a plurality of cable guiding means about the outer side thereof to hold convolutes of the cable in spaced apart tracks, each guiding means consisting of an annular groove with raised sides formed from the material of the band and extending beyond the outer surface thereof.

3. A piston ring compressor unit comprising an overlapping flexible band having a cylindrical form and a standard having a cable tightening element toward one end and a plurality of cable spacing studs at the other end thereof, said other end having a side thereof in abutment with an outer side of the band, a single piece of flexible cable formed into a pair of spaced apart loops about the band and having its length passed around said studs and the extreme ends of the cable fixed to a near end of the tightening element, so that when the tightening element is operated to shorten the cable about the band, the overlapping portions of the band slide along one another uniformly at all portions thereof to reduce the perimeter of the band, said studs being so positioned and said cable so passed about said studs that said cable extends from said tightening element, thence around a stud, thence around said band to another stud, thence around said stud and axially of said band to another stud, thence around said stud and around said band to another stud, thence around said stud to the tightening element.

4. The unit recited in claim 3 wherein the band is provided with a plurality of spaced apart annular grooves about the outer side thereof, said grooves holding the cable in position upon the band, each groove having spaced apart raised sides formed from the material of the band and extending beyond the outer surface of the band.

RUSSELL G. DEAN.